(12) United States Patent
Goetting et al.

(10) Patent No.: US 11,824,471 B2
(45) Date of Patent: Nov. 21, 2023

(54) METHOD AND DEVICE FOR CALIBRATING THE CONTROL OF AN ELECTRIC MACHINE

(71) Applicant: Robert Bosch GmbH, Stuttgart (DE)

(72) Inventors: Gunther Goetting, Stuttgart (DE); Lei Chen, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/772,831

(22) PCT Filed: Sep. 25, 2020

(86) PCT No.: PCT/EP2020/076922
§ 371 (c)(1),
(2) Date: Apr. 28, 2022

(87) PCT Pub. No.: WO2021/083590
PCT Pub. Date: May 6, 2021

(65) Prior Publication Data
US 2022/0407442 A1    Dec. 22, 2022

(30) Foreign Application Priority Data
Oct. 31, 2019   (DE) .................. 10 2019 216 831.0

(51) Int. Cl.
*H02P 21/18*   (2016.01)

(52) U.S. Cl.
CPC .................................. *H02P 21/18* (2016.02)

(58) Field of Classification Search
CPC .......... H02P 21/18; H02P 6/183; H02P 21/24; H02P 21/00; G01R 31/66; G01R 31/34
See application file for complete search history.

(56) References Cited

U.S. PATENT DOCUMENTS

| 2005/0127857 | A1 | 6/2005 | Miyauchi | |
| 2010/0253258 | A1* | 10/2010 | Fabis | H02P 21/06 318/400.13 |

(Continued)

FOREIGN PATENT DOCUMENTS

| CN | 102375119 A | * | 3/2012 | ............. G01R 31/34 |
| CN | 108847802 A | * | 11/2018 | |

(Continued)

OTHER PUBLICATIONS

Translation of International Search Report for Application No. PCT/EP2020/076922 dated Jan. 19, 2021 (3 pages).

*Primary Examiner* — Bickey Dhakal
(74) *Attorney, Agent, or Firm* — Michael Best & Friedrich LLP

(57) ABSTRACT

The invention relates to a method for calibrating the control of an electrical machine, comprising the steps of: applying at least one electrical test signal having a specified direction in a d-q coordinate system to the electrical machine; measuring the change in the rotor angle of a rotor of the electrical machine according to the applied at least one electrical test signal; and calibrating the control of the electrical machine, the control being carried out using the d-q coordinate system, and the orientation of the d-q coordinate system being determined on the basis of the measured change in the rotor angle of the rotor of the electrical machine.

14 Claims, 1 Drawing Sheet

(56) References Cited

U.S. PATENT DOCUMENTS

| | | | | |
|---|---|---|---|---|
| 2012/0038299 A1* | 2/2012 | Villwock | ................ | H02P 23/14 |
| | | | | 318/400.12 |
| 2012/0217921 A1* | 8/2012 | Wu | ........................ | G01R 31/66 |
| | | | | 318/490 |
| 2013/0241454 A1* | 9/2013 | Nemeth-Csoka | ....... | H02P 21/18 |
| | | | | 318/400.33 |
| 2014/0070746 A1* | 3/2014 | Siddalingappa | ........ | H02P 21/26 |
| | | | | 318/400.33 |
| 2018/0054147 A1* | 2/2018 | Frick | ....................... | H02P 21/18 |

FOREIGN PATENT DOCUMENTS

| | | |
|---|---|---|
| DE | 10311028 A1 | 10/2004 |
| DE | 102005045835 A1 | 3/2007 |
| DE | 102012205540 A1 | 10/2013 |
| DE | 102014209603 B3 | 4/2015 |
| DE | 102014212383 A1 | 12/2015 |
| DE | 102015217986 A1 | 3/2017 |
| EP | 3288179 A1 | 2/2018 |

* cited by examiner

METHOD AND DEVICE FOR CALIBRATING THE CONTROL OF AN ELECTRIC MACHINE

BACKGROUND OF THE INVENTION

The present invention relates to a method for calibrating the control of an electric machine and to an apparatus for calibrating the control of an electric machine.

Electric drive systems have many applications, in the domestic field, in vehicles, and in industry.

Drive systems comprise electric machines that are controlled by a controller. In the case of field-oriented control, the control of the torque is decoupled from the control of the flux. Good accuracy in the rotational speed and the positioning can in that way be achieved. Advantageously a d-q coordinate system that moves along with the rotor of the electric machine is considered for this purpose.

The d-axis and the q-axis are perpendicular to one another. The q-value corresponds to the torque of the electric machine, and the d-value corresponds to the magnetic flux density. The q- and d-values can be controlled by the controller, as in the case of a DC machine with a PI controller. In particular, the torque of the electric machine can be influenced by a predefined q-reference value.

Accurate control of electric machines requires an accurate knowledge of the rotor angle at all times. Angle encoders that measure angles can be arranged at the rotor shaft to determine the rotor angle.

Encoderless drive systems that omit an angle encoder are also known. As a result, the system costs can be reduced and the robustness and space requirement can be improved.

To determine the rotor position in such encoderless drive systems, an anisotropy of the electric machine can be determined. For example, the position and angular dependency of the electric machine can be determined by means of high-frequency excitation. An exemplary method for identifying the magnetic anisotropy of an electric rotary field machine is known from DE 10 2015/217986 A1.

In the operation of the electric machine, technical defects can occur, such as the determination of an incorrect rotor offset angle, an incorrect phase sequence, or the like. This can have the result that the actual direction of rotation of the electric machine is not correctly determined. As a result, the control can lead to an unwanted direction of rotation of the electric machine and, as a result of that, for example to an incorrect direction of movement of a vehicle driven by the electric machine. To avoid such safety-relevant malfunctions, it is necessary to determine the direction of rotation of the electric machine reliably.

There is therefore a need for methods for accurately calibrating the control of an electric machine.

SUMMARY OF THE INVENTION

The invention provides a method for calibrating the control of an electric machine and an apparatus for calibrating the control of an electric machine.

According to a first aspect, the invention accordingly relates to a method for calibrating the control of an electric machine. At least one electrical test signal with a predefined direction in a d-q coordinate system is applied to the electric machine. A change in a rotor angle of a rotor of the electric machine is measured depending on the applied at least one electrical test signal. The control of the electric machine is calibrated, wherein the control takes place using the d-q coordinate system, and wherein an orientation of the d-q coordinate system is determined with reference to the measured change in the rotor angle of the rotor of the electric machine.

According to a second aspect, the invention accordingly relates to an apparatus for calibrating the control of an electric machine. The apparatus comprises a signal generator, a measuring device and a calibrating device. The signal generator is designed to apply at least one electrical test signal with a predefined direction in a d-q coordinate system to the electric machine. The measuring device is designed to measure a change in a rotor angle of the rotor of the electric machine depending on the applied at least one electrical test signal. The calibration device is designed to calibrate the control of the electric machine, wherein the control takes place using the d-q coordinate system. The calibration device determines an orientation of the d-q coordinate system with reference to the measured change of the rotor angle of the rotor of the electric machine.

Preferred embodiments are the subject matter of the respective subclaims.

The invention makes it possible, through the application of the electrical test signal, to determine a direction of rotation of the electric machine reliably. For this purpose the electrical test signal is applied with a predefined direction in the d-q coordinate system. The precise direction itself does not yet have to be known initially. It is, rather, sufficient that the test signal has a fixed direction in the d-q coordinate system that is rotating along with the rotor. According to one embodiment, the position of the axes of the d-q coordinate system can be known, although the precise alignment not yet. In particular, it cannot yet be known in which direction the q-axis is aligned. If now, for example, a test signal with a predefined direction is applied along the q-axis, then the direction of rotation can be determined on the basis of the measured change in the rotor angle. If the rotor angle changes in a positive direction it can, for example, be ascertained that the test signal was applied in a positive direction along the q-axis.

The invention thus makes it possible to ascertain the orientation of the d-q coordinate system. The control of the electric machine can thereby be calibrated. This can mean that the control signals with which the electric machine is controlled by the controller are calculated and applied to the electric machine while taking the ascertained orientation of the d-q coordinate system into consideration.

According to one embodiment of the method for calibrating the control of an electric machine, the plausibility of a hypothesis regarding an orientation of the d-q coordinate system can be checked. Thus it is to be assumed that a specific direction corresponds to a positive q-direction in the d-q coordinate system. If, on application of an electrical test signal along the positive q-axis, a corresponding change in the rotor angle is also measured in the positive direction, the hypothesis is confirmed. If, however, on application of the electrical test signal along the positive q-axis, a change in the rotor angle is measured in the negative direction, the hypothesis is refuted. It is instead recognized that the determined direction corresponds to the negative q-direction in the d-q coordinate system.

The invention thus makes it possible to prevent an incorrect direction of rotation of an electric machine.

According to one embodiment of the method for calibrating the control of an electric machine, an offset angle of the rotor of the electric machine is determined before applying the electrical test signal. It is thus ascertained whether the software angle, i.e. the angle used for control by the controller, corresponds to the true rotor angle.

According to one embodiment of the method for calibrating the control of an electric machine, the determination of the offset angle of the rotor of the electric machine takes place on the basis of a measurement of an anisotropy of the electric machine. The determination or calibration of the offset angle of the rotor of the electric machine can be determined in the framework of a specific measurement accuracy. The direction of the flux axis can, for example, be determined with an accuracy of +/−20°. After the determination of the offset angle, however, an uncertainty of 180° can nevertheless remain. In other words, the direction of the flux along the flux axis is still unknown. Whether this is a positive or negative direction is determined using the method for calibrating the control of the electric machine.

According to one embodiment of the method for calibrating the control of an electric machine, a plurality of electrical test signals are applied to the electric machine, while the predefined directions of the test signals in the d-q coordinate system differ from one another. If the determination of the alignment of the d-q coordinate system is not clear on the basis of a single test signal, an unambiguous alignment can be ascertained by using multiple further electrical test signals.

According to one embodiment of the method for calibrating the control of an electric machine, the application of the at least one electrical test signal with a predefined direction in a d-q coordinate system to the electric machine comprises the application of a first test signal with a first predefined direction in the d-q coordinate system to the electric machine. If the application of the first test signal does not bring about any change in the rotor angle of the rotor of the electric machine, a second test signal with a second direction differing from the first predefined direction in the d-q coordinate system is applied to the electric machine. For example, components of the electric machine can be pre-stressed, so that impressing the first test signal does not bring about a significant movement of the rotor. The second test signal can bring about a stronger change in the rotor angle of the rotor of the electric machine, so that the orientation of the d-q coordinate system can be determined.

According to one embodiment of the method for calibrating the control of an electric machine, the second direction is opposite to the first direction in the d-q coordinate system.

According to one embodiment of the method for calibrating the control of an electric machine, the electrical test signal is a voltage signal or a current signal. The signal can have an arbitrary signal form. In particular, the signal can be stepped, sinusoidal, pulsed or the like.

According to one embodiment of the method for calibrating the control of an electric machine, a maximum voltage or a maximum current strength of the electrical test signal is increased successively until a change in the rotor angle of the rotor of the electric machine is measurable. By increasing in steps, an excessive movement, i.e. too great a change in the rotor angle of the rotor of the electric machine, can be prevented. In particular it is possible to ensure that a wheel angle of the motor vehicle that is driven by the electric machine remains unchanged during the application of the method for calibrating the control of the electric machine. Due to the gear ratio, and the limited stiffness of the drivetrain, the slight change in the rotor angle of the rotor of the electric machine does not lead to a movement of the vehicle itself.

According to one embodiment of the method for calibrating the control of an electric machine, the electric machine is stationary when the electrical test signal is applied.

Method steps are numbered for the purpose of clarity, and do not in general imply any specific temporal sequence. In particular, multiple method steps can also be carried out simultaneously.

DETAILED DESCRIPTION

Figure 1:
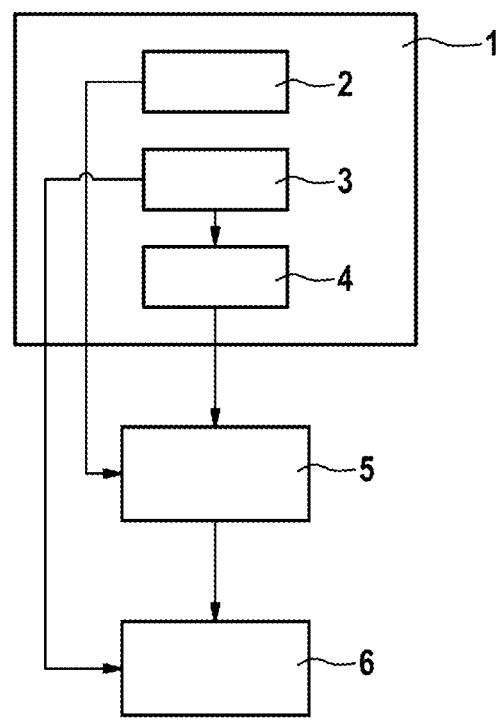
FIG. 1 shows a schematic block diagram of an apparatus for calibrating the control of an electric machine according to one embodiment of the invention.

FIG. 1 shows a schematic block diagram of an apparatus 1 for calibrating the control of an electric machine 6.

The apparatus 1 comprises a signal generator 2, a measuring device 3 and a calibration device 4. The electric machine 6 comprises a rotor and a stator, and is controlled by a controller 5 (control device). The signal generator 2 generates an electrical test signal that is applied by the controller 5 to the electric machine 6.

The electrical test signal can be a voltage signal or a current signal that has a predefined direction in a d-q coordinate system. This implies that the direction in the coordinate system rotating together with a rotor of the electric machine 6 does not change. The orientation of the d-q coordinate system does not, however, have to be known yet.

It can be provided that the electrical test signal is only applied to the electric machine 6 when the electric machine is stationary. Sensors can be provided for this purpose. If the electric machine drives a vehicle, it is possible, for example, to ascertain that the vehicle is stationary.

It can further be provided that an offset angle of the rotor of the electric machine 6 is determined before the application of the electrical test signal. The determination of the offset angle of the rotor of the electric machine preferably takes place by measuring an anisotropy of the electric machine. The measurement of the anisotropy can be done by the measuring device 3.

The measuring device 3 is further designed to measure a change in the rotor angle of the rotor of the electric machine 6 depending on the applied electrical test signal. In particular the measuring device 3 can determine the direction in which the rotor of the electric machine 6 is turning. The measuring device 3 outputs a corresponding measurement signal.

The calibration device 4 evaluates the measurement signal of the measuring device 3 in order to ascertain the orientation of the d-q coordinate system. If, for example, the position of the d-axis and q-axis is known on the basis of the determination of the offset angle of the rotor, but not yet the precise orientation of the d-axis and the q-axis, the orientation of the d-axis and the q-axis can be ascertained on the basis of the direction of rotation of the rotor of the electric machine that results from the application of the electrical test signal.

For example, the signal generator 2 can apply an electrical test signal in a first direction along a q-axis. If the rotor angle of the rotor changes in a positive direction, it can be recognized that the first direction is a positive direction of the q-axis.

The calibration device 4 calibrates the controller 5, i.e. transmits the orientation of the d-q coordinate system to the controller 5. The controller 5 performs the further control of the electric machine 6, taking the transmitted orientation of the d-q coordinate system into consideration.

If the measuring device 3 does not measure a change in the rotor angle of the rotor of the electric machine 6, or only an insignificant one, the signal generator 2 can apply a further electrical test signal by means of the controller 5 to the electric machine 6. The further electrical test signal can have a direction in the d-q coordinate system opposite to the direction of the first electrical test signal.

The signal generator 2 can further be designed to increase the strength of the electrical test signal, thus for example a voltage or current strength, successively. An electrical test signal is thus applied each time to the electric machine 6 to measure the change in the rotor angle of the rotor of the electric machine 6. If the change of the rotor angle is smaller than a predefined threshold value, the strength of the electrical test signal is increased.

Figure 2:
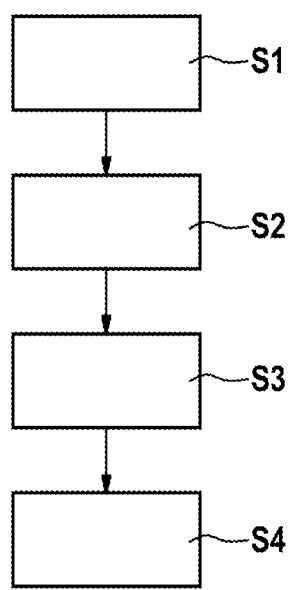
FIG. 2 shows a schematic flow diagram of a method for calibrating the control of an electric machine according to one embodiment of the invention.

FIG. 2 shows a schematic flow diagram of a method for calibrating the control of an electric machine.

In a first method step S1 it is ensured that the electric machine 6 is stationary.

Optionally an offset angle of the rotor of the electric machine 6 is furthermore determined. The determination of the offset angle can be done through measurement of an anisotropy of the electric machine 6. The direction of a flux axis can be determined with a certain accuracy, for example +/−20°, as a result. The position of the axes of the d-q coordinate system is thus known. The precise orientation of the d-q coordinate system does not, however, have to be ascertained yet.

In a second method step S2 an electrical test signal is applied to the electric machine 6 with a predefined direction in the d-q coordinate system. For example, the electrical test signal can correspond to a first direction along a q-axis.

In a third method step S3 a change in a rotor angle of a rotor of the electric machine 6 that results from the applied electrical test signal is measured.

In a further method step S4, the orientation of the d-q coordinate system is determined on the basis of the measured change of the rotor angle of the rotor of the electric machine 6. If, for example, an excitation in the positive direction along the q-axis brings about a change of the rotor angle in the positive direction, then when a change of the rotor angle in the positive direction is measured, it can be concluded that the test signal was also aligned in the positive direction along the q-axis.

The control of the electric machine 6 by the controller 5 is subsequently performed taking the ascertained orientation of the d-q coordinate system into consideration. The controller 5 has thus been calibrated.

It can further be provided that a plurality of electrical test signals that differ from one another in the predefined directions in the d-q coordinate system are applied to the electric machine 6.

A first test signal with a first predefined direction in the d-q coordinate system can thus initially be applied to the electric machine 6. If the resulting change in the rotor angle of the rotor of the electric machine 6 is not measurable, or only has a low value that is below a predefined threshold value, a second test signal with a second direction different from the first predefined direction can be applied to the electric machine 6. The second direction can preferably be opposite to the first direction. It can further be provided that further test signals with further directions in the d-q coordinate system are applied in order to improve the accuracy of the measurements.

It can finally also be provided that a maximum voltage or a maximum current strength of the electrical test signal is increased successively until a change in the rotor angle of the rotor of the electric machine can be measured, i.e. the friction of the rotor and the gearbox is overcome.

The invention claimed is:

1. A method for calibrating the control of an electric machine (6), the method comprising of:
   applying (S2) at least one electrical test signal with a predefined direction in a d-q coordinate system to the electric machine (6);
   measuring (S3) a change in a rotor angle of a rotor of the electric machine (6) depending on the applied at least one electrical test signal; and
   calibrating (S4) the control of the electric machine (6), wherein the control takes place using the d-q coordinate system, wherein an orientation of the d-q coordinate system is determined on the basis of the measured change of the rotor angle of the rotor of the electric machine (6), and wherein plausibility of a hypothesis is checked with regard to the orientation of the d-q coordinate system by the calibrating of the control of the electrical machine (6).

2. The method as claimed in claim 1, wherein an offset angle of the rotor of the electric machine (6) is determined (S1) before applying the electrical test signal.

3. The method as claimed in claim 2, wherein the determination of the offset angle of the rotor of the electric machine (6) takes place on the basis of a measurement of an anisotropy of the electric machine (6).

4. The method as claimed in claim 1, wherein a plurality of electrical test signals are applied to the electric machine (6), wherein the predefined directions of the test signals in the d-q coordinate system differ from one another.

5. The method as claimed in claim 1,
   wherein the application of the at least one electrical test signal with a predefined direction in a d-q coordinate system to the electric machine (6) comprises the application of a first test signal with a first predefined direction in the d-q coordinate system to the electric machine (6); and
   wherein, when the application of the first test signal does not bring about a change in the rotor angle of the rotor of the electric machine (6), a second test signal with a second direction differing from the first predefined direction in the d-q coordinate system is applied to the electric machine (6).

6. The method as claimed in claim 5, wherein the second direction is opposite to the first direction in the d-q coordinate system.

7. The method as claimed in claim 1, wherein the electrical test signal is a voltage signal or a current signal.

8. The method as claimed in claim 7, wherein a maximum voltage or a maximum current strength of the electrical test signal is increased successively until a change of the rotor angle of the rotor of the electric machine (6) is measurable.

9. The method as claimed in claim 1, wherein the electric machine (6) is stationary when the electrical test signal is applied.

10. An apparatus (1) for calibrating the control of an electric machine (6), the apparatus comprising:
    a signal generator (2) that is configured to apply at least one electrical test signal with a predefined direction in a d-q coordinate system to the electric machine (6);
    a measuring device (3) that is configured to measure a change in a rotor angle of the rotor of the electric machine (6) depending on the applied at least one electrical test signal; and
    a calibration device (4) that is configured to calibrate the control of the electric machine (6), wherein the control takes place using the d-q coordinate system, wherein the calibration device (4) is configured to determine an orientation of the d-q coordinate system on the basis of the measured change in the rotor angle of the rotor of the electric machine (6), and wherein plausibility of a hypothesis is checked with regard to the orientation of the d-q coordinate system by the calibrating of the control of the electrical machine (6).

11. The apparatus as claimed in claim 10, wherein an offset angle of the rotor of the electric machine (6) is determined (S1) before applying the electrical test signal, and wherein the determination of the offset angle of the rotor of the electric machine (6) takes place on the basis of a measurement of an anisotropy of the electric machine (6).

12. The apparatus as claimed in claim 10, wherein the application of the at least one electrical test signal with a predefined direction in a d-q coordinate system to the electric machine (6) comprises the application of a first test signal with a first predefined direction in the d-q coordinate system to the electric machine (6); and wherein, when the application of the first test signal does not bring about a change in the rotor angle of the rotor of the electric machine (6), a second test signal with a second direction differing from the first predefined direction in the d-q coordinate system is applied to the electric machine (6).

13. A method for calibrating the control of an electric machine (6), the method comprising of:

applying (S2) at least one electrical test signal with a predefined direction in a d-q coordinate system to the electric machine (6);

measuring (S3) a change in a rotor angle of a rotor of the electric machine (6) depending on the applied at least one electrical test signal; and calibrating (S4) the control of the electric machine (6), wherein the control takes place using the d-q coordinate system, and wherein an orientation of the d-q coordinate system is determined on the basis of the measured change of the rotor angle of the rotor of the electric machine (6), wherein the application of the at least one electrical test signal with a predefined direction in a d-q coordinate system to the electric machine (6) includes the application of a first test signal with a first predefined direction in the d-q coordinate system to the electric machine (6); and wherein, when the application of the first test signal does not bring about a change in the rotor angle of the rotor of the electric machine (6), a second test signal with a second direction differing from the first predefined direction in the d-q coordinate system is applied to the electric machine (6).

14. The method as claimed in claim 13, wherein an offset angle of the rotor of the electric machine (6) is determined (S1) before applying the electrical test signal, and wherein the determination of the offset angle of the rotor of the electric machine (6) takes place on the basis of a measurement of an anisotropy of the electric machine (6).

* * * * *